Jan. 28, 1964    O. D. HITT ETAL    3,119,256
PRONY BRAKE APPARATUS

Filed Aug. 1, 1960    2 Sheets-Sheet 1

INVENTORS:
Otis D. Hitt
and Robert E. Stine.
BY Bair, Freeman & Molinare
ATTORNEYS.

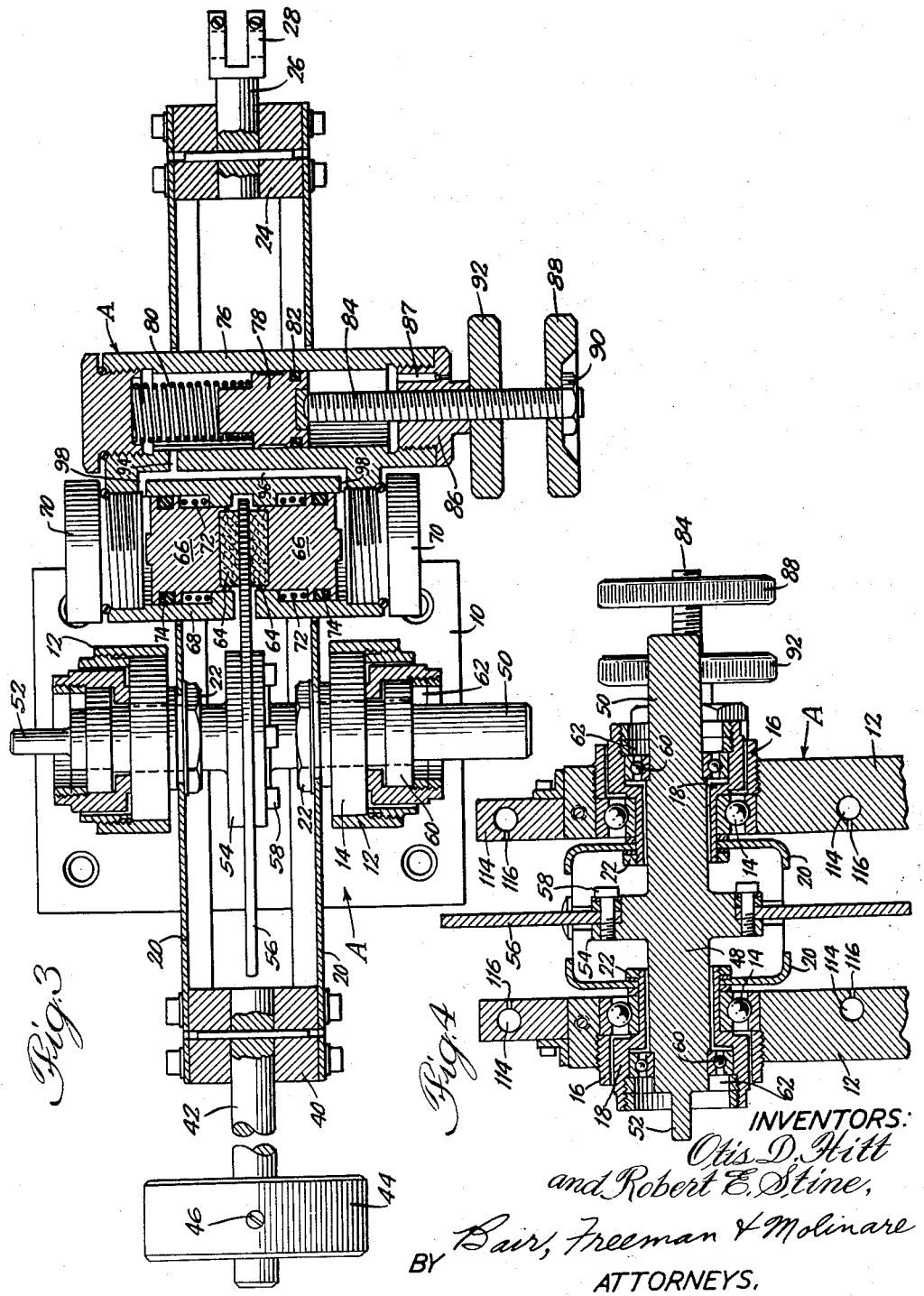

United States Patent Office 3,119,256
Patented Jan. 28, 1964

3,119,256
PRONY BRAKE APPARATUS
Otis D. Hitt, Bryan, and Robert E. Stine, Montpelier, Ohio, assignors to The Aro Corporation, a corporation of Ohio
Filed Aug. 1, 1960, Ser. No. 46,818
4 Claims. (Cl. 73—135)

This invention relates to a Prony brake type of torque analyzer and specifically the apparatus constituting such a device.

One object of the invention is to provide a Prony brake apparatus which is comparatively simple and inexpensive to manufacture.

Another object is to provide a Prony brake apparatus in which a torque receiving arm is journaled with respect to a stationary base by means of substantially frictionless bearings, and in turn carries substantially frictionless bearings for a torque receiving shaft journaled therein to minimize loss due to friction in the apparatus when it is used for torque analyzation purposes.

Still another object is to provide a comparatively simple brake mechanism including a brake disc confined between a pair of friction shoes, and hydraulic means manually adjustable to vary the pressure of the friction shoes on the brake disc as desired.

A further object is to provide a Prony brake apparatus which has minimum mass and inertia effects and may be readily cooled so as to maintain constant frictional characteristics during the operation of the apparatus.

A still further object is to provide an arrangement of elements of the apparatus such that a symmetrical and well balanced design of brake disc and torque arm between spaced uprights carrying the bearings prevents any inaccuracies of operation due to torsional twisting moments as found in non-symmetrical designs.

With these and other objects in view, our invention consists in the construction, arrangement and combination of the various parts of our Prony brake apparatus, whereby the objects above contemplated are attained, as hereinafter more fully set forth, pointed out in our claims and illustrated in detail on the accompanying drawings, wherein:

FIG. 3 is a horizontal sectional view on the line 3—3 of FIG. 2 showing the parts on an enlarged scale; and FIG. 4 is a vertical sectional view on the line 4—4 of FIG. 2 similarly enlarged.

Figure 2:
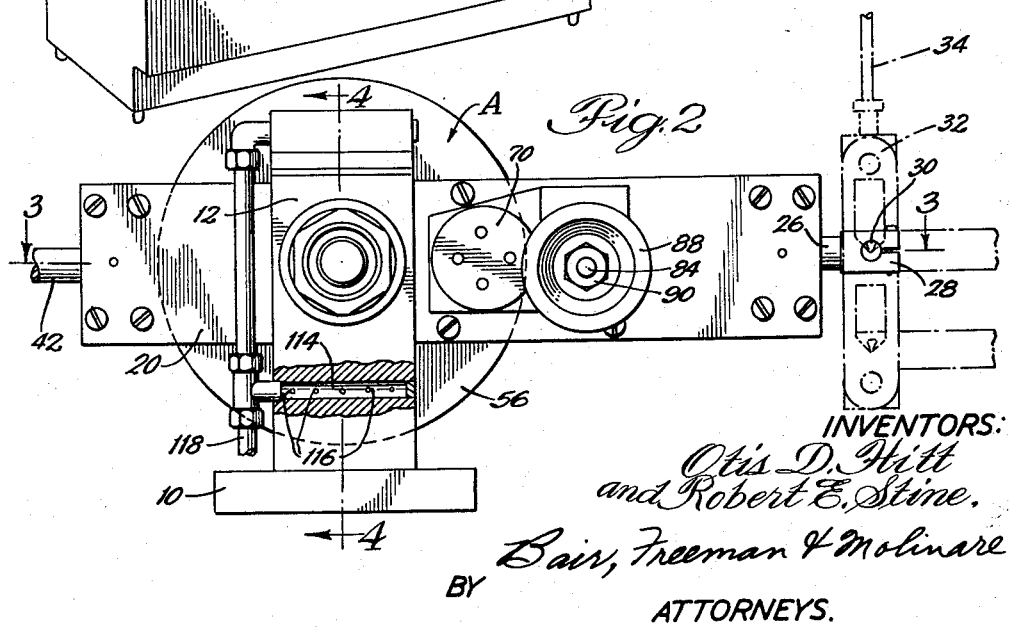
FIG. 2 is a side elevation of the Prony brake apparatus per se.

On the accompanying drawings, we have used the reference character H to indicate in general a housing for our Prony brake apparatus and accessories used in connection therewith. Our Prony brake apparatus is indicated generally at A and is shown per se in FIGS. 2, 3 and 4.

The apparatus A comprises a base 10 from which a pair of uprights 12 extend. A pair of bearings 14 are provided in the uprights 12. Bearing retainers 16 serve to retain the bearings 14 in the uprights. Journaled in the bearings 14 are sleeves 18 which are connected to side frames 20 by means of lock nuts 22 threaded on the sleeves 18 and confining the inner races of the bearings 14 against shoulders of the sleeves 18 as obvious in FIG. 4.

The side frames 20 are channel-shaped in cross section as shown in FIG. 4 and are connected together at one of their ends (the right-hand end in FIG. 3) by a connector block 24 and suitable screws. A rod 26 is pinned in the block 24 and extends therefrom to terminate in a bifurcated head 28. A knife edge element 30 is clamped in the bifurcated head 28 and its knife edge coacts with a yoke 32 having knife edge seats as more fully disclosed by Plouck et al. in U.S. Patent No. 3,060,757. Briefly the yoke 32 is connected by a control rod 34 to the mechanism of a scale S (see FIG. 1) supported in the housing H and more specifically to the scale hand 36 thereof which cooperates in the usual manner with a scale face 38 for indicating pull on the rod 34.

At the left-hand end of the side frames 20 another connector block 40 is provided in which is mounted a rod 42. A counterweight 44 is mounted on the rod for counterbalancing the torque arm comprised of the side frames 20, as for proper operation its two ends must be in balance. A set screw 46 is provided for locking the counterweight 44 in position after it is properly adjusted.

We provide a torque receiving shaft 48 having a torque receiving end 50, and its opposite end is reduced as indicated at 52 and also adapted to receive torque depending on the type of connection provided between the device being torque-analyzed and the shaft 48. By way of example, a suitable adaptor may be used on the end 50 whereas the end 52 is adapted to be received in the chuck of a power drill or the like. The shaft 48 has a hub 54 to which is secured a brake disc 56 as by screws 58. The disc 56 may be of any suitable metal and its surfaces are preferably polished very smoothly.

Bearings 60 are provided for the shaft 48 and are carried by the sleeves 18. Bearing retainers 62 serve to locate the bearings in the sleeves.

For cooperation with opposite faces of the brake disc 56, we provide a pair of friction shoes 64 of woven asbestos or the like shown in FIG. 3 which are carried by pistons 66 located in a cylinder 68. Cylinder heads 70 close the outer ends of the cylinder 68 and within the cylinder brake release springs 72 are provided for the piston 66. Suitable sealing rings 74 are provided on the pistons 66.

A cylinder 76 is also provided in which there is a piston 78 biased in one direction by a return spring 80. The piston 78 has a seal 82, and to actuate the piston a rod 84 is provided threaded in a cylinder head 86. A piston actuating hand wheel 88 is secured to the piston actuating rod 84 by threading it thereon and locking it thereto with a lock nut 90. The element 92 is a hand wheel type lock nut, the purpose of which will hereinafter appear.

The cylinder 76 is provided with a hydraulic fluid outlet 94 leading to a manifold passageway 96 that terminates in ports 98 leading to the opposite ends of the cylinder 68 behind the pistons 66 therein. The space in the cylinder 76 above the piston 78 in FIG. 3, the passageways 94, 96 and 98 and the space in each end of the cylinder 68 beyond the pistons 66 therein is filled with hydraulic fluid.

Returning to FIG. 1 a vertically adjustable platform 100 is provided, the adjustment of which may be effected by a crank 102. A supporting bracket 104 is mounted thereon having a supporting ring 106 provided with set screws 108 to support a pneumatic motor or the like 110. At 112 is a suitable connector coupling between the shaft of the motor 110 and the torque receiving end 50 of the torque receiving shaft 48.

Provision is made for cooling the disc 56 during operation in the form of manifold passageways 114 and air discharge holes 116. A compressed air pipe 118 supplies air to the passageways 114.

*Practical Operation*

Figure 1:
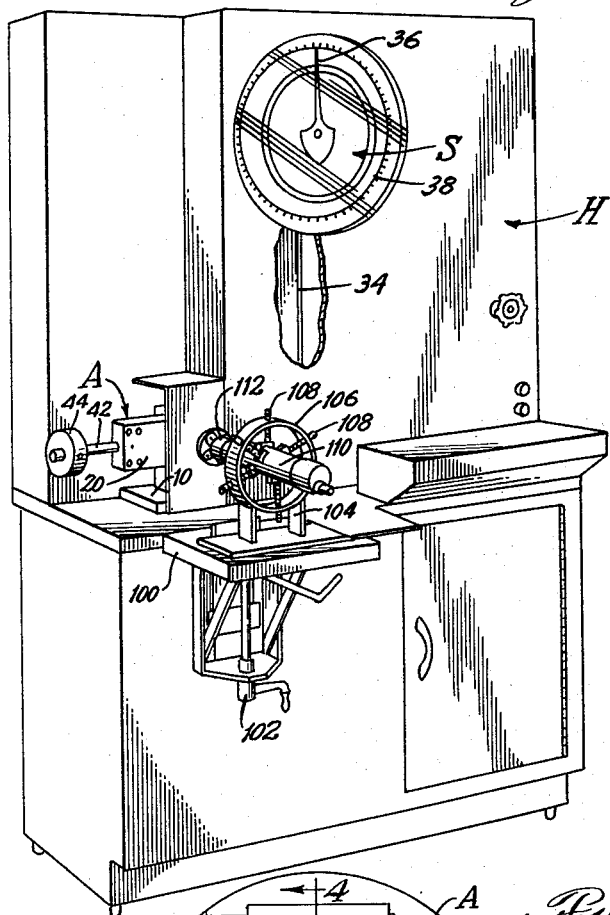
FIGURE 1 is a perspective view of a torque analyzer unit including our Prony brake apparatus.

In the operation of our Prony brake apparatus, after the motor 110 is mounted as shown in FIG. 1, compressed air may be supplied thereto and the motor will rotate the brake disc 56. Adjustable brake friction is applied to the disc by the friction shoes 64, this being accomplished by screwing inwardly the rod 84 with respect to the cylinder 76 and thereby forcing the piston 78 upwardly in FIG. 3 to apply additional hydraulic pressure back of the pistons 66 in the cylinder 68. Thus the degree of friction may be nicely controlled. Then the torque produced by the motor 110 may be determined from the reading on the scale S in the usual manner.

From the foregoing specification it will be obvious that a comparatively simple apparatus has been provided for the Prony brake type analyzation of torque. As compared with a drum type brake there is minimum mass and inertia effects, and cooling to maintain constant frictional characteristics is readily accomplished by the discharge of air directly against the brake disc. A disc type also eliminates "self-energizing" effects of drum type brakes and therefore is more sensitive to gradual load application.

Our method by which the torque receiving shaft and the brake disc are supported is of major importance relative to the accuracy of the apparatus. The double bearing arrangement 14—60, particularly when testing low torque, high speed power sources, is much more sensitive through a bearing arrangement of this type. Reaction through the bearings when supporting a shaft being driven at high speeds is often of significance. For this reason the sleeves 18 are attached to the side frames 20 so that the reaction load is measured on the load scale S, and the bearing 14 are provided to support the side frames 20 in as nearly a frictionless and reactionless manner as possible since the side frames rotate through only a limited angle as a function of the load scale rate. Thus the full output torque of the power source being tested is transmitted to the load scale with an absolute minimum of frictional losses.

Some changes may be made in the construction and arrangement of the parts of our Prony brake apparatus without departing from the real spirit and purpose of our invention, and it is our intention to cover by our claims any modified forms of structure or use of mechanical equivalents which may reasonably be included within their scope.

We claim as our invention:

1. In a Prony brake apparatus, a support, a pair of spaced uprights thereon, a rolling type bearing in each upright, a sleeve journaled in each bearing, a brake arm located between said uprights, said brake arm having a pair of side plates, one connected to each of said sleeves, other rolling type bearings in said sleeves, a torque receiving shaft journaled in said other bearings, a brake disc on said torque receiving shaft and located between said side plates, friction elements on opposite sides of said brake disc, pistons backing said friction elements, a cylinder extending transversely through and supported by said side plates, and containing said pistons, a second cylinder extending transversely through and supported by said side plates, a third piston in said second cylinder, hydraulic fluid in said second cylinder between the piston therein and the pistons in said first cylinder, adjusting means for said third piston, and means for operatively connecting one end of said brake arm with a scale for measuring the pull of said arm thereon as produced by the application of torque to said torque receiving shaft.

2. A Prony brake apparatus comprising a base, a pair of uprights thereon in spaced-apart relation, a sleeve journaled in each upright, a torque receiving shaft journaled in said sleeves, a brake disc thereon between said uprights, a lever arm having a pair of sides on opposite sides of said disc and between it and said uprights, each of said sides being connected to one of said sleeves, a pair of cylinders carried by said lever arm, said brake disc intersecting one of said cylinders, pistons in said last cylinder on opposite sides of said brake disc and provided with friction shoes, a third piston in said second cylinder, hydraulic fluid in said second cylinder, passageway means for conducting the fluid therefrom to said first cylinder on the outer ends of the two pistons therein, screw threaded means for moving said third piston in said second cylinder, and an operative connection between one end of said arm and a device for indicating the pull exerted by said arm when torque is applied to said torque receiving shaft.

3. A Prony brake apparatus comprising a pair of uprights, a sleeve journaled in each upright, a torque receiving shaft journaled in said sleeves, a brake disc thereon, a lever arm between said uprights and connected to said sleeves, a pair of cylinders carried by said lever arm, said brake disc intersecting one of said cylinders, pistons therein on opposite sides of said brake disc, friction shoes interposed between said pistons and said brake disc, a third piston in said second cylinder, hydraulic fluid in said second cylinder, passageway means for conducting the fluid therefrom to said first cylinder on the outer ends of the two pistons therein, screw threaded means for moving said third piston in said second cylinder, an operative connection between said lever arm and a device for indicating pull exerted by said arm, said uprights being provided with cooling medium discharge openings directed toward opposed faces of said brake disc, and means for supplying cooling medium to said openings.

4. A Prony brake apparatus comprising a support, a pair of sleeves journaled therein, a brake arm connected to said sleeves, a torque receiving shaft journaled in said sleeves, a brake disc on said torque receiving shaft, friction brake shoes on opposite sides of said brake disc, adjustable hydraulic means carried by said brake arm and acting oppositely on said brake shoes, means for operatively connecting said arm with a scale for measuring the torque acting thereon through said torque receiving shaft, said support having cooling medium discharge ports directed toward said disc, and means for supplying cooling medium to said ports for discharge therefrom.

References Cited in the file of this patent

UNITED STATES PATENTS

| | | |
|---|---|---|
| 1,711,866 | Williams | May 7, 1929 |
| 1,777,423 | Zeder | Oct. 7, 1930 |
| 2,004,950 | Jenkins | June 18, 1935 |
| 2,111,801 | Olson | Mar. 22, 1938 |
| 2,306,845 | Sherman et al. | Dec. 29, 1942 |
| 2,909,922 | Haman | Oct. 27, 1959 |